US011253785B1

(12) United States Patent
Niknafs et al.

(10) Patent No.: US 11,253,785 B1
(45) Date of Patent: Feb. 22, 2022

(54) INCENTIVIZING FAIR GAMEPLAY THROUGH BOT DETECTION PENALIZATION WITHIN ONLINE GAMING SYSTEMS

(71) Applicant: Electronic Arts Inc., Redwood City, CA (US)

(72) Inventors: Arash Niknafs, Burnaby (CA); Najmeh Tavassoli, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 160 days.

(21) Appl. No.: 16/774,523

(22) Filed: Jan. 28, 2020

Related U.S. Application Data

(60) Provisional application No. 62/798,194, filed on Jan. 29, 2019.

(51) Int. Cl.
*A63F 13/75* (2014.01)
(52) U.S. Cl.
CPC .................................. *A63F 13/75* (2014.09)
(58) Field of Classification Search
CPC ....................................................... A63F 13/75
See application file for complete search history.

(56) References Cited

U.S. PATENT DOCUMENTS

| | | | |
|---|---|---|---|
| 10,427,048 B1* | 10/2019 | Lundquist | ............... A63F 13/35 |
| 2008/0059474 A1* | 3/2008 | Lim | ...................... G06F 21/316 |
| 2017/0236370 A1* | 8/2017 | Wang | .................. G07F 17/3218 |
| | | | 463/25 |

* cited by examiner

*Primary Examiner* — Reginald A Renwick
(74) *Attorney, Agent, or Firm* — Lee & Hayes, P.C.

(57) ABSTRACT

A bot detection system and method analyzes application programming interface (API) data associated with an online gaming player account to make a determination of whether the player account is engaging in cheating by using a bot during online game play. The API data may be analyzed to generate API metadata that is descriptive of the API data, such as an indication of how many API calls were made to a particular API during a particular time period on behalf of the player account. The API data may be applied to one or more bot detection models to make an assessment of whether the player account is using a bot. If bot usage is detected with a player account, enforcement actions, such as slowing down game play or banning the player account, may be implemented for that player account.

20 Claims, 7 Drawing Sheets

INCENTIVIZING FAIR GAMEPLAY THROUGH BOT DETECTION PENALIZATION WITHIN ONLINE GAMING SYSTEMS

CROSS REFERENCE TO RELATED APPLICATIONS

This application claims the benefit of U.S. Provisional Application No. 62/798,194 filed Jan. 29, 2019, which is incorporated herein by reference in its entirety.

BACKGROUND

Online gaming allows for players to play a variety of electronic and/or video games with each other via network connectivity, such as via the Internet. Users who wish to play a game may be matched with each other to play the game, even though those players may be remotely located from each other. This online gaming may be enabled by online gaming system(s) to which each of the players may connect using client devices.

Some online gamers may engage in cheating by using internet robots (e.g., bots), or automated mechanisms that may interact with the online gaming system(s). The bots may give the cheating player an unfair advantage in gameplay, which degrades the gameplay experience for non-cheating players. As bots have become more sophisticated, such as in mimicking human behavior, it has become increasingly difficult to detect bots and cheating players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
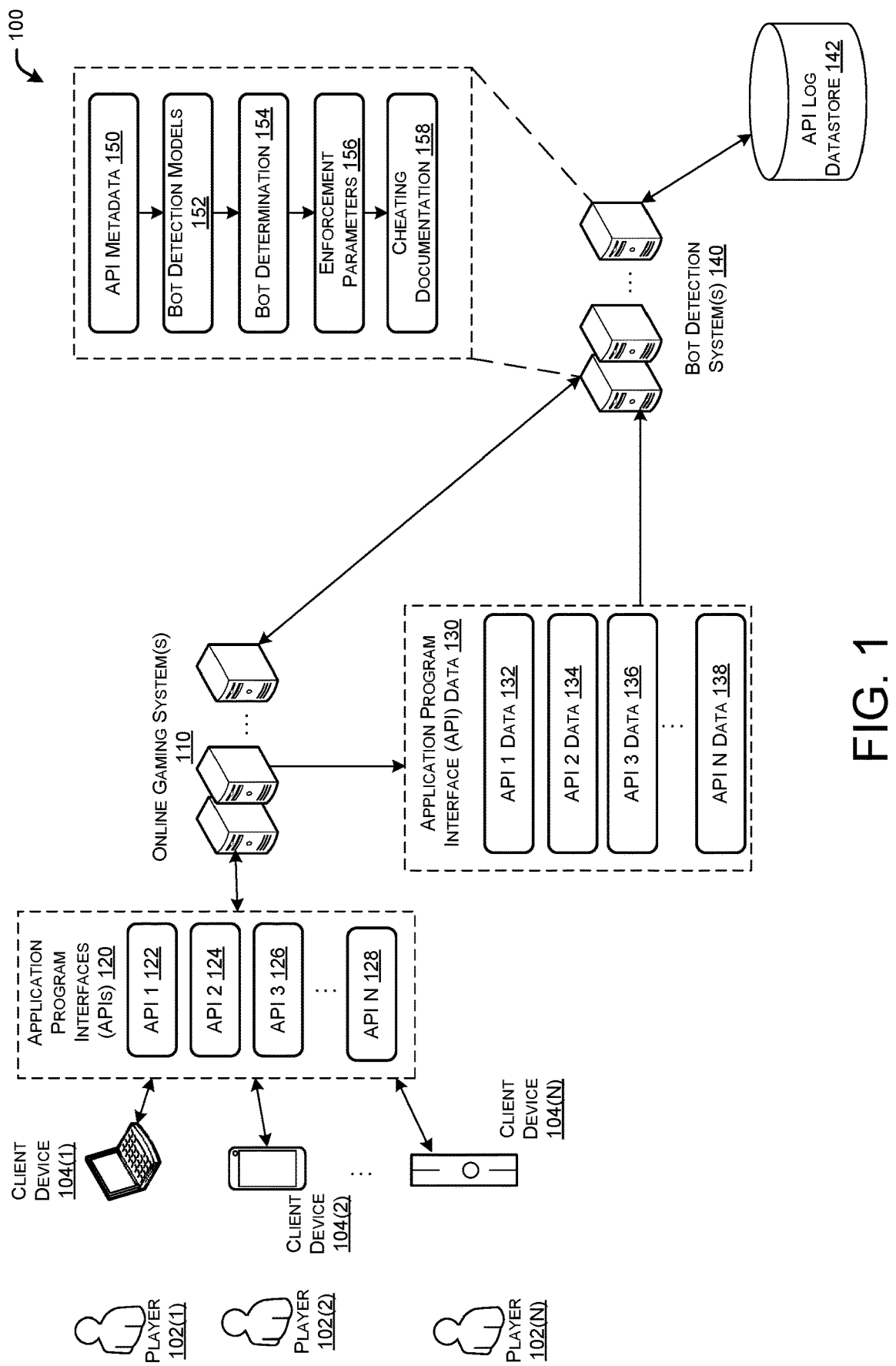
FIG. 1 illustrates a schematic diagram of an example environment with online gaming system(s) to enable online gaming via client device(s) and bot detections system(s) that enable bot detection during online game play, in accordance with example embodiments of the disclosure.

Example embodiments of this disclosure describes methods, apparatuses, computer-readable media, and system(s) for detecting online game players who are cheating in online games, such as by using bots. The bots may engage with one or more application programming interfaces (APIs) of the online gaming system(s). According to example embodiments of the disclosure, API interactions by a game player's game device may be used to determine whether that game player is using a bot. When a player is found to be cheating by using bots, that player's account may be disadvantaged (e.g., slowed down, functions dropped, access paused, etc.) and/or banned altogether.

Under normal game playing interactions without the player cheating using a bot, game playing parameters, representing updates in the online game and moves or actions that the player wishes to make, may be sent back and forth between the player's client device and the online gaming system that hosts the online game. These parameters may be passed back and forth between the client devices and the online gaming system in the form of data packets via APIs of the game being played. These APIs allow for the standardization of the parameters, such as by providing a format and/or set of rules by which a player's client device and the online gaming system communicate with each other to allow the player to play the game.

Based at least in part on parameters received by the client device via APIs of the online game rendered from the online gaming system, the content of the game may be rendered at the client device of a player. Similarly, the client device may receive player input, such as via a joystick, touchscreen, mouse, and/or any suitable user interface device. The client device may use the user input to generate parameters representative of the user input which may then be communicated to the online gaming system via the APIs. This communication of parameters from the client device to the online gaming system via the APIs may be referred to as API calls. A particular online game may include more than one API to which API calls may be made by a client device player with a corresponding player account. The player account may be used for identifying the user and/or for various other purposes, such as providing access to online gameplay.

A player may cheat on an online game by using a bot that makes API calls on behalf of the player. In other words, the bot may interface with the online game via the APIs of the online game and play the game or portions of the game instead of the player. The bot may be able to play the game better than the player, thereby providing the player with an unfair advantage by using the bot. The use of a bot by a player, therefore, is cheating by the player and can reduce the enjoyment of the game for other players playing the online game. As such, addressing bot use is paramount in providing a fair gameplay environment for all players of an online game.

Bots, to evade detection, may be designed to reduce the magnitude of their super-human game play abilities. For example, delays may be programmed into a bot so that it doesn't appear that reaction times are at levels that are not possible by humans. Thus, bots with this level of sophistication of evasion detection may be difficult to detect by conventional means.

According to example embodiments of the disclosure, the bots may be detected by using API data associated with a player profile. API data associated with a particular player profile may be collected over a predefined time period. The analysis for bot detection may be performed by a bot detection system. The bot detection system may receive API data for one or more APIs of an online game. The bot detection system may organize this data in a datastore. For example, the API data, such as API calls, may be organized by player profile and may include a timestamp. As API data becomes available over a predefined time period for a player profile, the bot detection system may generate API metadata descriptive of the API data for one or more time periods. This API metadata, or data descriptive of the API data over the predefined time period(s), may be applied to one or more bot detection models to determine if a bot is being used for game play for the particular player profile. If it is determined that a bot is being used for game play with the particular player profile, enforcement actions may be implemented, such as banning the player account, slowing down the player profile's game play, and/or other suitable enforcement actions. In some example embodiments, documentation may be generated to document the cheating incident associated with the particular player account.

The API metadata may include any variety of data about the API data over a time period. According to example embodiments, the API metadata for a particular player profile, a particular time period, and a particular API of a particular online game may include a total count of API calls, a mean number of API calls over nonoverlapping segments of the particular time period, and a standard deviation of API calls over the nonoverlapping segments of the particular time period made by the particular player profile over the particular time period to the particular API.

As an example, the time period may be an hour, and the API metadata for over the one hour time period may include a total number of API calls, or API call count, to an API of an online game by the player profile. Additionally, a mean number of API calls over 60 1-minute segments of the hour may be determined. Further still, a standard deviation of API calls over the 60 1-minute segments of the hour may be determined. Thus, the API metadata for the player profile may include the total count, mean, and standard deviation of the number of API calls for the API for the player profile.

In some example embodiments, API metadata may be generated for more than one API for a particular game. For example, for a particular game, API metadata may be generated for API data from five different APIs. In some example embodiments, API metadata may be generated for more than one time period for a particular game. For example, for a particular game, API metadata may be generated for API data for three different time periods, such as one hour, one day, and one week. Although, total count, mean, and standard deviation API metadata have been discussed herein, it should be understood that the API metadata may include any variety of data descriptive of the underlying API data, including any suitable statistical data descriptive of the API data. After the API metadata is generated for a player profile, the API metadata may be provided to one or more bot detection models to determine if the API data and/or the API metadata derived therefrom indicate the use of a bot associated with the player profile.

As a non-limiting example, API data may be received by the bot detection system for four different APIs of a game for a player. The bot detection system may generate API metadata for a one week time period with one day time segments and also for a one month time period with 3-day time segments. The API metadata may include the total API call count, average API call counts across the time segments, and standard deviation of the API call counts across the time segments. As a result, in this example, 24 different pieces of metadata may be generated for the player for analysis using the bot detection models to determine if the player is cheating by using a bot.

When a bot is detected, the bot detection system may determine an enforcement action to take against the player. The bot detection system may generate an enforcement parameter corresponding to the enforcement action to be taken against the player based on the player's bot use. For example, a player who engages in minimal bot use to automate in-game trading or a particular item would be imposed an enforcement action less severe than a player who habitually uses a bot to assist or automate gameplay in an online multiplayer game session. The bot detection system may send the enforcement parameter to the online gaming system to implement the corresponding enforcement action against the player by identifying his or her player account.

In some cases, the enforcement action may include slowing down game play (e.g., adding latency), banning the player account from further game play, or any other suitable enforcement action. The enforcement action(s) imposed on a player account caught cheating may be commensurate with the egregiousness of the cheating actions. Such enforcement actions, promote fairness of game play and make online gaming more enjoyable for players, particularly those who do not cheat.

The bot detection models may be any suitable model, such as any variety of machine learning and/or artificial intelligence models. For example, the bot detection models may include decision tree models, gaussian tree models, Bernoulli models, random forest models, combinations thereof, or the like. Other models used as bot detection models may include, for example, linear regression models, neural network models, Bayesian network models, any variety of heuristics (e.g., genetic algorithms, swarm algorithms, etc.), combinations thereof, or the like. These bot detection models may be trained using training data that may include known determinations of whether the training data is from a bot. Outputs from the bot detection models may be combined to make a determination of whether the API metadata indicates that the corresponding player profile is engaging in cheating by using a bot. The combination of the outputs may be a weighted combination of the bot detection models.

The bot detection models may be trained using training data. In example embodiments, the training data may be acquired by the online gaming system and the bot detection system during game play. When interactions known to either not use a bot or use a bot are detected, those interactions may be used to train the bot detection models. API data associated with a known use of a bot may be generated by creating player accounts and deploying a bot for the purposes of collecting training data.

Training data may also be collected from online gaming by various players where bot use may be detected by various mechanisms, such as a tripwire mechanism. The use of a tripwire may involve changing APIs to include decoy parameters and determining if a particular player profile attempts to access a decoy parameter of an API. If a player profile attempts to access an API parameter that is not supposed to be accessed or does not populate an API parameter when it is to be specified, then that player profile may be determined to be using a bot. For example, a decoy parameter that is not to be accessed may be added to a particular API and any player accounts that access that decoy parameter may be identified as using a bot. Similarly, changes may be implemented so that a new parameter in a particular API is to be accessed and any player account that does not access that parameter may be identified as using a bot. In this way, API data may be collected and classified as either using a bot or not using a bot to generate training data for training the bot detection models.

Although examples in the realm of video games and online gaming are discussed herein, it should be understood that the bot detection mechanisms, as described herein, may be applied to any variety of online interactions. Indeed, without providing an exhaustive list of applications, the bot detection models, as generated and deployed, may be applied to any suitable type of online commerce, online competitions, online gambling, online sales, social media interactions, etc.

It should be understood that the systems and methods, as discussed herein, are technological improvements in the field of online interactions and online gaming. For example, the methods and systems as disclosed herein enables computing resources to improve online gaming for players by preventing cheating by some players. These improvements manifest in accuracy, precision, automation, efficiencies, thoroughness, speed, objectivity, and repeatability over traditional mechanisms of detecting bots in online interactions. Indeed, the disclosure herein provides improvements in the functioning of computers to provide improvements in the technical field of online gaming and the prevention of cheating. Machine learning and artificial intelligence (AI)-based processes are disclosed that can provide assessment of all, or nearly all players playing an online game to prevent cheating, even when players may be using sophisticated bots that attempt to mimic human behavior. This type of extensive evaluation of players to detect what are sometimes sophisticated detection-evading bots may not be possible with traditional mechanisms of bot detection. Traditional methods may not be able to make use of the API data that is being generated by bot usage to detect cheating by bot use. Additionally, the mechanisms as discussed herein cannot be performed by the human mind. Furthermore, the mechanisms and systems discussed herein, provide objective and repeatable evaluations of player accounts, such that possible cheating by bot usage can be effectively documented. Additionally, the technological problems addressed here are ones that arise in the computer-era and the Internet-era, such as in the fields of online gaming. Thus, not only is the disclosure directed to improvements in computing technology, but also to a variety of other technical fields related to online gaming.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with online gaming system(s) 110 to enable online gaming via client device(s) 104 and bot detections system(s) 140 that enable bot detection during online game play, in accordance with example embodiments of the disclosure. The example environment 100 may include one or more player(s) 102(1), 102(2), . . . 102(N), hereinafter referred to individually or collectively as player 102 or player(s) 102, who may interact with respective client device(s) 104(1), 104(2), . . . 104(N), hereinafter referred to individually or collectively as client device 104 or client device(s) 104.

The client devices 104 may be configured to render content associated with the online game to respective players 102. This content may include video, audio, haptic, combinations thereof, or the like content components. The client device(s) 104 may receive game state information from the one or more online gaming system(s) 110 that may host the online game played by the player(s) 102 of environment 100. The receiving of game state information and/or parameters may be via one or more application program interfaces (APIs) 120 of the online game being hosted by the online gaming systems 110. The APIs 120 may include any suitable number of APIs 122, 124, 126, 128.

The client device(s) 104 may use the game state information to render current events of the online game as content. The game state information may be received by the client device(s) 104 repeatedly and/or continuously and/or as events of the online game transpire. The game state information may be based at least in part on the interactions that each of the player(s) 102 have via their client device(s) 104 responsive to events of the online game hosted by the game system(s) 110.

As events transpire in the online game, the game system(s) 110 may update game state information and send that game state information to the client device(s) 104. For example, if the players 102 are playing an online soccer game, and the player 102 playing one of the goalies move in a particular direction, then that movement and/or goalie location may be represented in the game state information that may be sent, via the APIs 120, to each of the client device(s) 104 for rendering the event of the goalie moving in the particular direction. In this way, the content of the online game is repeatedly updated throughout game play. When the game client device(s) 104 receive the game state information from the game system(s) 110, the game client device(s) 104 may render updated content associated with the online game to its respective player 102. This updated content may embody events that may have transpired since the previous state of the game (e.g., the movement of the goalie). It should be appreciated that any other suitable mechanism and/or topology of communications may be used between the game system(s) 110 and the client device(s) 104, according to example embodiments of the disclosure.

The client device(s) 104 may accept input from respective players 102 via respective input device(s) (e.g., joysticks, touchscreens, etc.). The input from the non-players 102 may be responsive to events in the online game. For example, in an online basketball game, if a player 102 sees an event in the rendered content, such as an opposing team's guard blocking the paint, the player 102 may use his/her input device to try to shoot a three-pointer. Intended action by the player 102, as captured via his/her client device 104 may be sent to the game system(s) 110 as parameters via the APIs 120 by the client device making API calls. Thus, the API calls via the APIs 120 allow the client devices 104 to send parameters representing player 102 actions to the online gaming system 110. The API calls by the client device made on behalf of a player (e.g., a player account of the player 102) may be made to any available API 122, 124, 126, 128 of the online game being hosted by the online gaming system 110.

The client device(s) 104 may be any suitable device, including, but not limited to the Sony Playstation® line of systems, Nintendo® handheld line of systems, Microsoft Xbox® line of systems, any gaming device manufactured by Sony, Microsoft, Nintendo, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 104 may execute programs thereon to interact with the game system(s) 110 and render game content based at least in part on game state information received from the game system(s) 110. Additionally, the client device(s) 104 may send indications of player input (e.g., player intended actions) to the game system(s) 110. Game state information and player input information and/or parameters may be shared between the game client device(s) 104 and the game system(s) 110 using the APIs 120.

The game system(s) 110 may receive inputs (e.g., parameters representative of player inputs) from various players 102 via API calls to the APIs 120 and update the state of the online game based thereon. As the state of the online game is updated, the state information and/or updates may be sent to the various client device(s) 104 for rendering online game content to players 102. In this way, the online gaming system(s) 110 host the online game.

The online gaming system 110 when hosting an online game among one or more players 102 with their player accounts on their respective client devices 104 may be configured to generate API data 130. This API data may include API data 132, 134, 136, 138 of the individual APIs 122, 124, 126, 128, respectively, of the online game being hosted by the online gaming system 110. The API data 130 may include the parameters that are associated with API calls made by the client devices 104. The API data 130 may also include timestamps and/or identifying information associated with the client device 104 and/or the player 102 with whom the API data 130 is associated.

If a bot is used by a particular player 102 on his or her client device 104 to cheat in playing an online game hosted by the online gaming system(s) 110, then the bot may interface with the APIs 120 of the online game. The bot may react to the online game directly via the APIs. In this way, the bot may play the online game, rather than the player playing the online game. When the state of the game changes (e.g., an opponent makes a move, resources are made available, etc.), the bot may react to the state of the game rather than the human player 102 reacting to the state changes in the game. Since a bot may be able to react to state changes of an online game faster and/or more effectively than a human, the use of a bot may provide an unfair advantage for the player 102 who cheats by using the bot.

A bot may leave fingerprints when interacting with the APIs 120 that may be detected. For example, a bot may make moves at super-human speeds at which a human player 102 would not be able to react to changes in game state. Such actions may be detected on the online gaming system 110 side and identified as a bot. However, bots may be designed to avoid and/or reduce super-human gameplay to avoid detection. Thus, super-human game play detection may not be an effective mechanism for bot detection for bots that employ sophisticated designs to evade detection. Another way to detect bot use may use trip-wire techniques where changes may be presented in the APIs such that parameters may be used (e.g., elements of the API may be accessed) that would otherwise not be accessed by non-bot assisted game play. These types of detection mechanisms that use changes in API parameters and/or decoy API parameters may be referred to as tripwires. These types of bot detection mechanisms may not always be effective and may require changes to the APIs to use. Thus, tripwire-based bot detection may not be used frequently on online gaming systems 110.

The API data 130 may be sent by the online gaming system(s) 110 and received by the bot detection system(s) 140. The bot detection system(s) 140 may be configured to store and/or retrieve API data 130 in an API log datastore 142. The bot detection system(s) 140 may manage and use the API data 130 to detect cheating associated with player accounts, such as by the use of bots.

The bot detection system(s) 140 may use API data 130, as received from the online gaming systems 110 and/or retrieved from the API log datastore 142, to generate API metadata 150. The API metadata may be any suitable data that is descriptive of the API data 130 associated with a particular player account associated with a particular player 102 and/or client device 104. For example, the API metadata 150 for a particular player account may include the number of API calls (e.g., API call count) made from the player account over a particular time period (e.g., a day, a week, a fortnight, etc.). Another example of API metadata 150 associated with a player account may include an average number of API calls made to a particular API of an online game by a particular player account over non-overlapping segments covering a particular time period. For example, a mean value of the number of API calls per day for a week time period may be determined. Other example API metadata 150 may include a standard deviation or any other descriptive statistic of the number of API calls made to a particular API of a game from a player account during segments of a particular time period.

In some cases, the API metadata 150 for a particular player account and/or a particular API 120 may be generated after a sufficient amount API data 130 has been collected to generate that API metadata 150. For example, API metadata 150 describing API calls over a one week time period may only be generated after collecting API data 130 for a particular player 102 over a one week time period.

When the API metadata 150 is generated, one or more bot detection models 152 may be invoked, by the bot detection systems 140, to make a determination of whether the API metadata 150 of a player account indicates that the player account is using a bot for online game play of a game hosted by the online gaming systems 110. There may be any suitable number and/or type of bot detection models 152. For example, bot detection models 152 may include a decision tree model, a gaussian tree model, a Bernoulli model, and a random forest model. Indeed, in other examples the bot detection models 152 may include any type and/or number of models and/or combinations of models. Other models that may be used as bot detection models may include, for example, linear regression models, neural network models, Bayesian network models, any variety of heuristics (e.g., genetic algorithms, swarm algorithms, etc.), combinations thereof, or the like. These bot detection models 152 may be trained using training data that may include known determinations of whether the training data is from a bot.

The bot detection systems 140 may use outputs from the bot detection models 152 to make a bot determination 154 indicating whether a particular player account is using a bot. The outputs from the bot detection models 152 may be combined to make the bot determination 154 of whether the API metadata indicates that the corresponding player profile is engaging in cheating by using a bot. The combination of the outputs may be a weighted combination of the bot detection models, such as a linear combination. Some of the bot detection models 152 may have binary outcomes (e.g., Bernoulli model outputs) and others may have a probabilistic outcome (e.g., gaussian tree model). The combination of the outputs of the bot detection models 152, therefore, may be a combination of binary outputs and/or probabilistic outputs. This combination of the output of the bot detection models 152 may be indicative of whether a bot is being used by a particular player 102 in playing a particular online game hosted by the online gaming systems 110. The bot detection systems 140 may provide the bot determination 154 associated with the player account.

The bot detection systems 140 may further be configured to determine one or more enforcement actions for those player accounts where bot usage has been detected. The bot detection systems 140 may generate enforcement parameters 156 that indicate the enforcement actions to be taken in response to bot-based cheating by a player 102. For example, the bot detection systems 140 may provide an enforcement parameter 156 that indicates that a particular player account that has regularly used a bot for game play automating or assisting gameplay in an online game is to be banned from online game play. As another example, the bot detection systems 140 may provide an enforcement parameter 156 that indicates that a particular player account that has just begun to use a bot for game play is to be slowed down so that the corresponding player 102 is at a disadvantage against other players 102 playing the online game.

Yet other enforcement parameters 156 may include disallowing a particular player account from accessing one or more of the APIs 122, 124, 126, 128. In other words, some functionality may be curtailed for the cheating players. For, example in a sports game, functionality for being able to trade players on a team may be turned off or curtailed for a cheating player. The enforcement parameters, as generated by the bot detection systems 140, may be sent to the online gaming systems 110 to enact the corresponding enforcement actions.

The bot detection systems 140 may further be configured to generate cheating documentation 158. The cheating documentation 158 may include information, such as a player account identifier, a timestamp when the player's bot detection was identified, API data 130 or portions thereof of the player 102, API metadata 150 or portions thereof of the player 102, bot detection model outcomes, bot determination 154, enforcement parameters 156 associated with the player account, and/or other notes associated with the player account. The cheating documentation 158 may be used, in some cases, to memorialize why a particular player account is impaired with enforcement actions. In some other cases, the cheating documentation 158 may be used to support any enforcement actions that are challenged by the corresponding player 102. In some cases, the cheating documentation 158 may be stored in a database, such as in the API log datastore 142.

Figure 2:
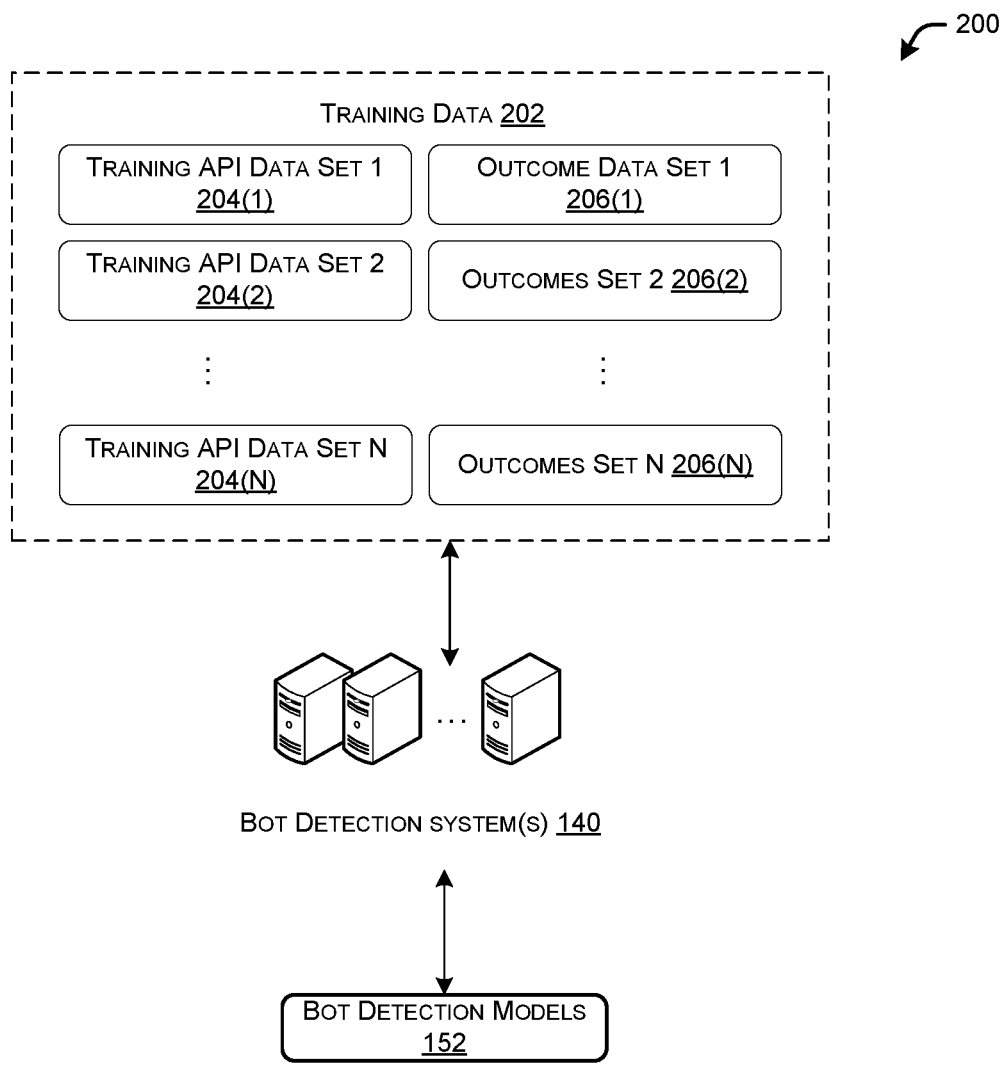
FIG. 2 illustrates an example environment where the bot detection system of FIG. 1 uses training data to generate bot detection models, in accordance with example embodiments of the disclosure.

FIG. 2 illustrates an example environment 200 where the bot detection system 140 of FIG. 1 uses training data 202 to generate bot detection models 152, in accordance with example embodiments of the disclosure. The bot detection system(s) 140, in some cases, may be configured to generate the bot detection models 152 used to generate the support assessment outputs 160. In other cases, a different entity may generate the bot detection models 152 using the mechanisms described herein and those bot detection models 152 may be provided to and used by the bot detection systems 140.

To generate bot detection models 152, the various models may be trained using the training data 202 as received by and/or generated by the bot detection system(s) 140. The training data 202 may include one or more training API data sets 204(1), 204(2), . . . , 204(N), hereinafter referred to, individually or in plurality, as training data set 204 or training data sets 204. The training data 202 may further include outcome data sets 206(1), 206(2), . . . , 206(N), hereinafter referred to outcome set 206 or outcome sets 206. Each of the API training data sets 204 may correspond to a respective outcome data set 206. The outcome data set 206 may indicate whether the corresponding API training data set 204 was generated by a bot. Thus, the training data 202 provides a multiple API training data sets 204 along with an indication of whether those API training data sets 206 were a result of bot-based game play. The training data 202 may be associated with any suitable API and/or combination of APIs of an online game hosted by the online gaming system 110.

The training data 202 may be gathered in any suitable manner, such as by deploying training data collection bots. These training data collection bots may be deployed within the bot detection system(s) 140 to monitor known cheating player accounts that utilize bots for the purposes of generating the training data 202. Bot usage in accounts may be detected, for example, by tripwire-type mechanisms, where a particular player account using a bot is exposed by accessing an API parameter that it is not supposed to access and/or by not accessing an API parameter that it is supposed to access. Tripwires, in some cases, may be set by making changes to the APIs 120, such as changes to the API data structures and/or data vectors. In other cases, tripwires may be set by pushing updates to software running on client devices 104 to change the API parameter structure when making API calls via the APIs 120 to the online gaming system 110. As a result, bot-driven interactions may access portions of the API that are not to be accessed or not access portions of the API that are to be accessed.

The bot detection models 152 may be any suitable model, such as any variety of machine learning and/or artificial intelligence models. For example, bot detection models 152 may include a decision tree model, a gaussian tree model, a Bernoulli model, and a random forest model. In other examples, the bot detection models 152 may include any type and/or number of models and/or combinations of models. Other models that may be used as bot detection models may include, for example, linear regression models, neural network models, Bayesian network models, any variety of heuristics (e.g., genetic algorithms, swarm algorithms, etc.), combinations thereof, or the like.

These bot detection systems 140 may be configured to train the bot detection models 152, as described herein. This training may be supervised, unsupervised, or partially supervised (e.g., semi-supervised). This training may include fitting the outcome data sets 206 of the training data 202 to API metadata derived from the training API data sets 204 of the training data 202. In example embodiments, the bot detection systems 140 may wait to train the bot detection models 152 until a sufficient amount of the training data 202 is available. It should be appreciated that more accurate and robust bot detection models 152 may be generated by using a larger corpus of training data 202.

Once the bot detection models 152 are generated using the training data 202, the bot detection models may be tested. This testing, in some cases, may be performed on a portion of the training data 202 or other training data 202 that had not been used to train the bot detection models 152. The performance of the individual bot detection models 152 in correctly determining the use of bots using API data with known outcomes may be used to weigh the combination of the bot detection models 152, when deployed, in making a final determination of whether a player account is using a bot. In some cases, errors in bot detection models 152 may not be equally considered when determining how to combine the outputs of the individual bot detection models 152. For example, the combination of the bot detection models 152 may be weighted in a manner to prevent false positives even if there is a greater likelihood of false negatives.

As a non-limiting example, there may be four bot detection models used for bot detection in a particular online game: a decision tree model, a gaussian tree model, a Bernoulli model, and a random forest model. These models may be generated by training using training data. The models may then be tested against additional API data to determine their performance. It may be found that the random forest model performs the best, followed by the decision tree model, then the Bernoulli model, and finally the gaussian tree model. In this case, the output of the random forest model may be weighted at 40%, the decision tree model at 30%, the Bernoulli model at 20%, and the gaussian tree model at 10%. This is an example weighting, and in some cases the weights selected for the bot detection models may be proportional to their relative performance in bot detection, false negatives, and/or false positives. Additionally, in cases where the bot detection systems 140 detect bots in different online games, the weights of various bot detection models in making a final determination of whether a bot is being used may be different from one online game to another.

Figure 3:
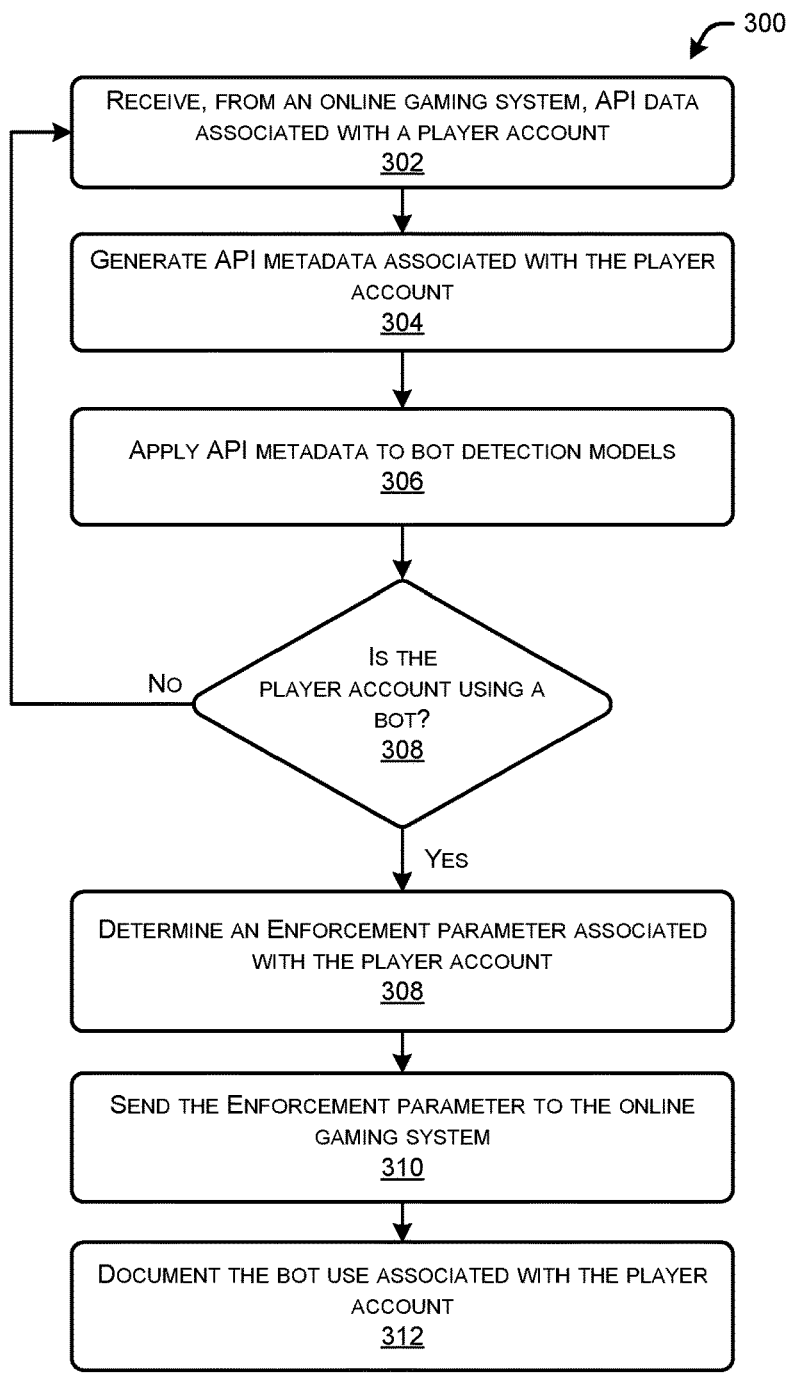
FIG. 3 illustrates a flow diagram of an example method by which bot usage may be detected within the online gaming system(s) hosting an online game and enforcement may be implemented, in accordance with example embodiments of the disclosure.

FIG. 3 illustrates a flow diagram of an example method 300 by which bot usage may be detected and enforcement may be implemented, in accordance with example embodiments of the disclosure. The method 300 may be performed by the bot detection system(s) 140, individually or in cooperation with one or more other elements of the environment 100.

At block 302, API data associated with a player account may be received. This API data 130 may be received from the online gaming system 110 and/or the API log datastore 142. The API data 130 to perform method 300, in some cases, may be available after a period of time. For example, if API data 130 over a month is needed for the player profile, then that API data 130 may be collected over a month before the subsequent processes of method 300 can be performed. The API data 130 may be received from the online gaming system 110 by any suitable communicative connection, such as the Internet, wide area network (WAN), local area network (LAN), combinations thereof, or the like.

At block 304, API metadata associated with the player account may be generated. The API metadata 150 may be generated by processing the received API data 130 associated with the player account. As described herein, in some cases, the API metadata 150 may include a tally or count of the number of API calls made to a particular API of a game over a particular period of time. For example, a number of API calls made to a particular API over a one week period may be determined as an API count metadata for the particular API for the player account. Similar to the API call count metadata, the API metadata 150 may additionally include a mean number of API calls over constituent segments of the time period (e.g., one day segments of the one week time period). Other constituents of the API metadata 150 may include, for example a standard deviation of API calls over constituent segments of the time period. In this way, the API metadata 150 may include any suitable number of descriptive metadata of the underlying API data 130 for any suitable APIs 120 and any suitable time periods for the player account.

At block 306, the API metadata may be applied to the bot detection models. Each of the bot detection models 152 may provide an indication of whether the API metadata 150 indicate whether the player account is using a bot. At block 308, it may be determined if the player account is using a bot. This determination may be made based at least in part on the outputs of the bot detection models 152. In the case of a plurality of bot detection models 152, the outputs of the bot detection models 152 may be combined to make an overall determination of whether the player account is using a bot during online game play on the online gaming systems 110.

At block 308, if it is determined that a bot is not being used with the player account, then the method 300 may return to block 302 to continue monitoring the API data associated with the player account. In some cases, player accounts may be checked for bot use on a continuous basis. In other cases, the player accounts may be checked for cheating on a defined periodic basis. If at block 308 it is determined, based at least in part on the outputs of the bot detection models, that the player account is using a bot during online game play, then the method may proceed to block 308, where an enforcement parameter may be determined for the player account. The enforcement parameter may be a code that is associated with an enforcement action, which may include, but is not limited to, slowing down (e.g., adding latency) the player account vis-à-vis other players, preventing the player account from accessing one or more functions of the online game, disallow certain moves or actions by the player account, or other online gameplay impairments of the like. This enforcement action may be determined and encoded as the enforcement parameter. In some cases, the enforcement action may be progressive if a player account is found to continue to cheat. For example, a first action when a player account is found to be cheating may be to slow down the account for a certain period of time. If the player account is caught cheating again, then the enforcement action may be escalated to prolonged slowed down times periods.

At block 310, the enforcement parameter may be sent to the online gaming system. This enforcement parameter may be sent in association with an identity of the player account (e.g., player account login). Sending this enforcement parameter to the online gaming system 110 may cause the implementation of the enforcement action corresponding to the enforcement parameter by the online gaming system 110 on the player account.

At block 312, the bot use associated with the player account may be documented. The cheating documentation 158 may include a variety of information, such as an identifier of a cheating player 102 (e.g., player account identifier/login, real world player name, real world player email address, etc.), a timestamp when cheating was detected, API data 130 or portions thereof of the player 102, API metadata 150 or portions thereof of the player 102, bot detection model outcomes, bot determination 154, enforcement parameters 156 associated with the player account, and/or other notes associated with the player account. The cheating documentation 158 may be used, in some cases, to memorialize why a particular player account is impaired with enforcement actions. In some other cases, the cheating documentation 158 may be used to support any enforcement actions that are challenged by the corresponding player 102.

In some cases, the cheating documentation 158 may be stored in a database, such as in the API log datastore 142.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
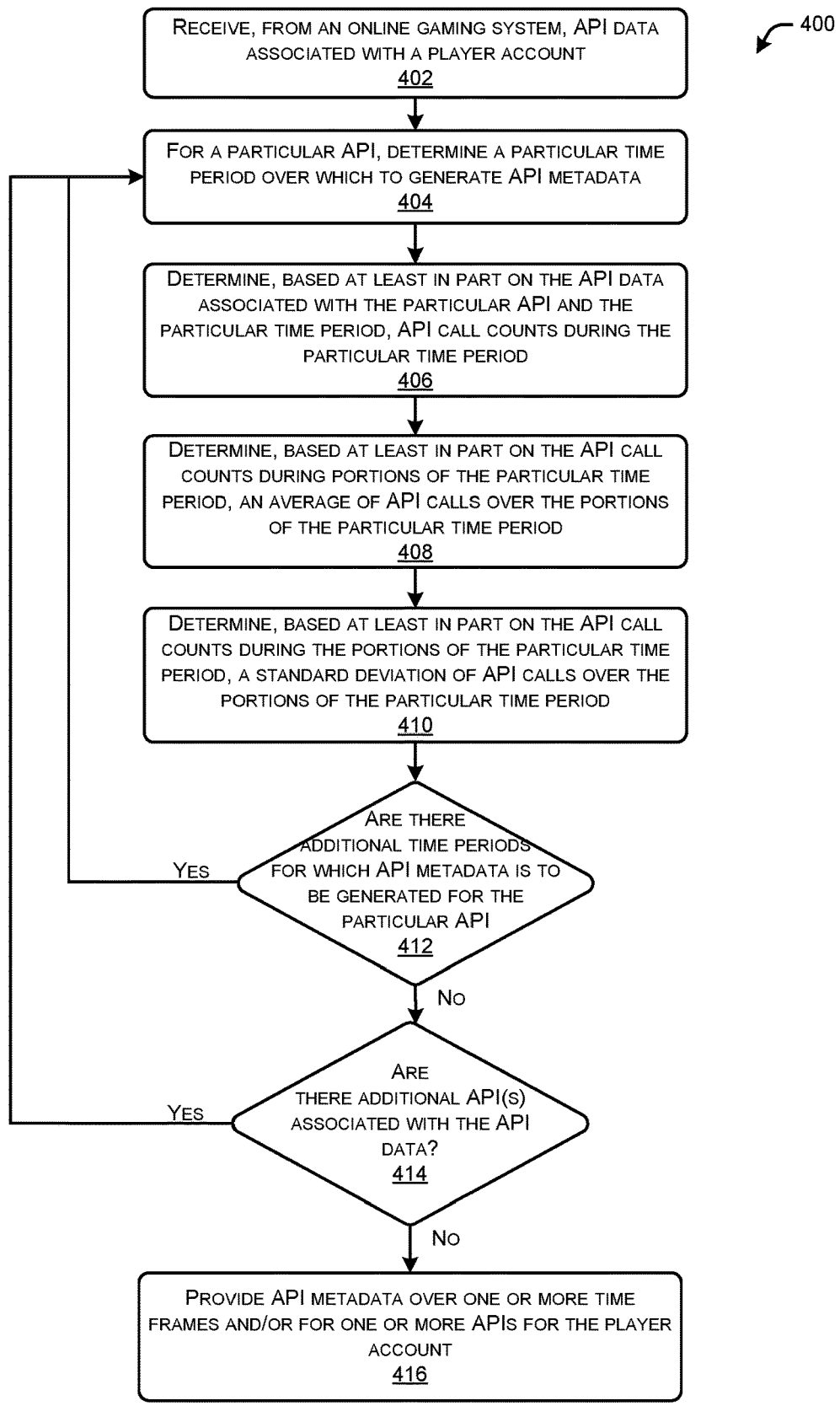
FIG. 4 illustrates a flow diagram of an example method for providing application program interface (API) metadata associated with a player gameplay for bot detection, in accordance with example embodiments of the disclosure.

FIG. 4 illustrates a flow diagram of an example method for providing application program interface (API) metadata associated with a user account for bot detection, in accordance with example embodiments of the disclosure. The method 400 may be performed by the bot detection system(s) 140, individually or in cooperation with one or more other elements of the environment 100. The method 400 may be an example process for the operations of block 304 of method 300 of FIG. 3.

At block 402, API data associated with a player account may be received from an online gaming system. In this case, the API data 130 may be game play data that is received via API calls by the client device 104. The API data 130, as received may be used to generate metadata, such as the number of API calls made via a particular API 120, the average number API calls made over segments of a time period, and/or the standard deviation of API calls made over the segments of the time period. In some cases, the API data 130 may be temporarily stored in the API log datastore 142 and retrieved when need by the bot detection system 140 to perform the processes of method 400.

At block 404, for a particular API, a particular time period may be identified over which API metadata is to be determined. In some cases, API metadata 150 may be determined over multiple different time periods and one of those time periods may be selected. For example, if API metadata 150 is to be determined over a day, a week and a month, the time period of a day may be selected first to generate API metadata 150 according to the processes of method 400. Similarly, there may be multiple APIs 120 for which API metadata 150 is to be generated and one of those APIs may be selected to start the API metadata generation processes.

At block 406, API call counts during the during the particular time period may be determined based at least in part on the API data associated with the particular API and the particular time period. For example, if the particular time period is one day, the number of API calls made to the particular API 120 may be determined over the previous day. The API calls made in any particular time period may be determined by using timestamps that may be part of the API data 130, as received from the online gaming system 110 and/or received from the API log datastore 142.

At block 408, an average of API calls over portions of the particular time period may be determined based at least in part on the API call counts during the portions of the particular time period. In other words, the particular time period may be analyzed by non-overlapping portions thereof. The API call counts for the particular API during each of the portions of the particular time period may be determined and averaged together to determine the API calls over the particular time period. For example, if the particular time period is a day and the portions of the day are the 24 hours of the day, then the average over the 24 hours may be determined. In some cases, the total API call counts may be divided by the total number of portions of the particular time period to determine the average of API calls over the portions of the particular time period.

At block 410, a standard deviation of API calls over the portions of the particular time period may be determined based at least in part on the API call counts during the portions of the particular time period. In other words, the particular time period may be analyzed by non-overlapping portions thereof. The API call counts for the particular API during each of the portions of the particular time period may be determined and a standard deviation of the API calls over the portions of the particular time period may be determined. For example, if the particular time period is a week and the portions of the week are the seven days of the week, then the number of API calls over each of the seven days may be determined and then the standard deviation over the seven days may be calculated.

At block 412, it may be determined if there are additional time periods over which API metadata is to be generated for the particular API. If there are any additional time periods for which API metadata is to be generated for the particular API for this player profile, then the method 400 may return to block 404 to repeat the processes of blocks 406, 408, and 410 over a different time period and/or portions thereof.

If, on the other hand, there are no additional time periods over which API metadata is to be generated for the particular API for this player profile, then the method 400 may continue to block 414, where it may be determined whether there are any additional APIs associated with the API data. In other words, it may be determined if there are additional APIs 120 for which API metadata 150 is to be generated for this player profile. If it is determined that there are additional APIs 120 for which API metadata is to be generated, then the method 400 may return to block 404, where the processes of blocks 406, 408, 410, and 412 are to be repeated for the next API 120.

If on the other hand, if it is determined that there are no additional APIs 120 for which API metadata is to be determined, then at block 416, API metadata over one or more time frames and/or one or more APIs may be provided for the player account. This API metadata 150 may applied to one or more bot detection models 152 to make a determination of whether the player account is using a bot to cheat on the online game.

It should be noted that some of the operations of method 400 may be performed out of the order presented, with additional elements, and/or without some elements. Some of the operations of method 400 may further take place substantially concurrently and, therefore, may conclude in an order different from the order of operations shown above. For example, in some cases, one or more of the total API call count, average of the API calls, and/or standard deviation of the API calls may not be included in the API metadata 150. There may also be other statistical descriptors of the API data 130 that may be included in the API metadata 150 that may be determined by processes similar to the ones described herein.

Figure 5:
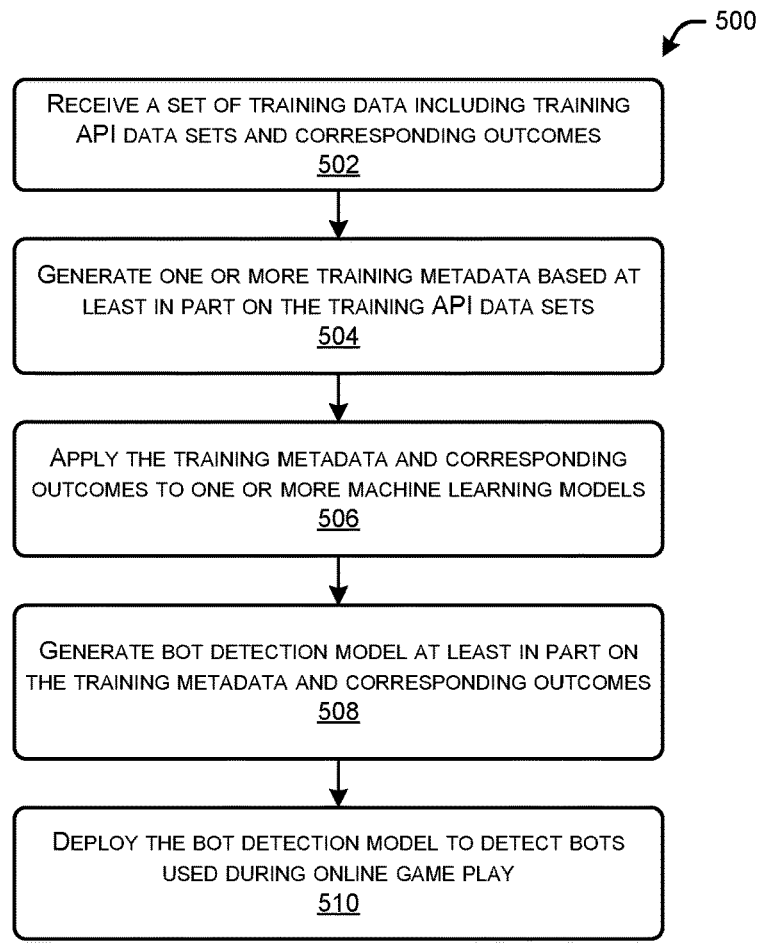
FIG. 5 illustrates a flow diagram of an example method to generate and deploy a bot detection model within the online gaming system(s) hosting an online game, in accordance with example embodiments of the disclosure.

FIG. 5 illustrates a flow diagram of an example method 500 to generate and deploy a bot detection model 152, in accordance with example embodiments of the disclosure. The method 500 may be performed by the bot detection system(s) 140, individually or in cooperation with one or more other elements of the environment 100. In alternative embodiments, the bot detection models 152 may be generated on separate systems and then deployed on the bot detection system 140.

At block 502, a set of training data including training API data sets and corresponding outcomes may be received. As discussed herein the training data 202 may be received by deploying bots in dummy player accounts to harvest or by collecting the training data 202 from player accounts where it is known whether the player account is using a bot or not.

Known usage of bots may be detected by deploying tripwires or otherwise by deploying decoy API parameters and/or changing API parameters that are to accessed on one or more APIs 120 of the online gaming system 110.

At block 504, one or more training metadata may be generated based at least in part on the training API data sets. The API metadata 150 may be generated using the processes of method 400 of FIG. 4. There may be any suitable number of elements in the API metadata 150 of each of the training API data sets 204. For example, if there are four different time periods over which training API metadata is to be generated for four different APIs 120 with three elements per time period, there may be 48 elements for the training API metadata for each training API data set 204.

At block 506, the training API metadata and the corresponding outcomes to may be applied to train one or more machine learning models. These machine learning models may be any suitable type of machine learning model, such as decision tree models, gaussian tree models, Bernoulli models, random forest models, linear regression models, neural network models, Bayesian network models, any variety of heuristics (e.g., genetic algorithms, swarm algorithms, etc.), combinations thereof, or the like. The training process may be any suitable process, such as a supervised, unsupervised, and/or partially supervised training. The training process, at block 508, may result in the generation of the bot detection models based at least in part on the training API metadata and corresponding outcomes. At block 510, the bot detection models may be deployed at the bot detection system 110 to detect bots used during online game play.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
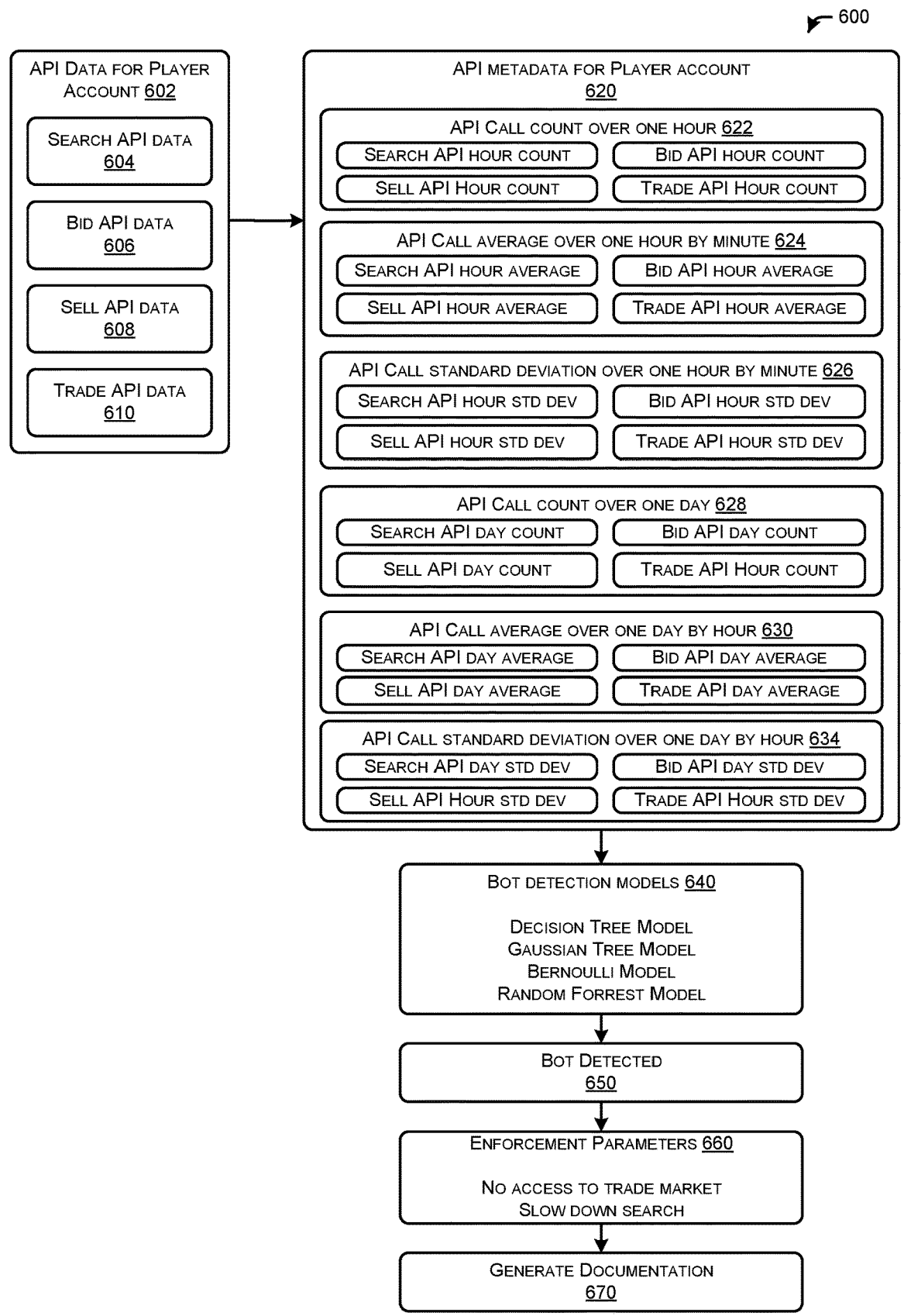
FIG. 6 illustrates a diagram of an example set of API data for a player account, API metadata for the player account, and bot detection and documentation procedures using the API metadata for the player account, in accordance with example embodiments of the disclosure.

FIG. 6 illustrates a diagram 600 of an example set of API data for a player account 602, API metadata for the player account 620, and bot detection and documentation procedures using the API metadata 620 for the player account, in accordance with example embodiments of the disclosure.

API data 602 for a player account may be received by the bot detection system 140 from the online gaming system 110. This API data 602 may include API data for four different APIs of an online game: search API data 604 associated with a search API, bid API data 606 associated with a bid API, sell API data 608 associated with a sell API, and trade API data 610 associated with a trade API. These APIs may be associated, for example, with a soccer online game. A player 102 may be able to create a soccer team to compete with other players online, as hosted by the online gaming system 110. The API data 602 may be game play data that is received via API calls by the client device 104. The API data 602, as received may be used to generate metadata, such as the number of API calls made via a particular API 120, the average number API calls made over segments of a time period, and/or the standard deviation of API calls made over the segments of the time period.

A client device 104 of a player 102 may make an API call (e.g., access the API) to the search API if the player 102 wishes to search for digital content (e.g., team players, vehicles, weapons, outfits, and other virtual in-game assets of the like) that he or she wishes to add to his or her team. Similarly, the client device 104 may make an API call to the bid API if the player 102 wishes to bid on a soccer player, and/or make an API call to the sell API is the player 102 wishes to sell one of his or her soccer players, and/or make an API call to the trade API if the player 102 wishes to trade one of his or her soccer players. As discussed herein, a bot provides an unfair advantage in making these types of transactions and therefore, the overall game experience can be made fair and equal for other players if cheaters are identified and impaired during their use of bots.

The API data for the player account 602 may be used to determine API metadata for the player account 620, as discussed herein. The API metadata 620 may include API call counts over one hour 622 for each of the APIs, API call average over one hour by minute segments 624 for each of the APIs, API call standard deviation over one hour by minute segments 626 for each of the APIs, API call counts over one day 628 for each of the APIs, API call average over one day by one hour segments 630 for each of the APIs, and API call standard deviation over one day by one hour segments 632 for each of the APIs. In this example, there are 24 different elements in the API metadata for the player account 620.

The API metadata for the player account 620, after generation by the bot detection system 140, may be applied to the bot detection models 640. In this example, there are four different bot detection models: a decision tree model, a gaussian tree model, a Bernoulli model, and a random forest model. Each of the bot detection models 640 may generate an output that gives an indication of whether the API metadata for the player account 620 indicates that the player account used a bot during online game play. Some of the outputs (e.g., for the Bernoulli model) may be a binary output (e.g., indicating that either a bot was or was not used), while other outputs (e.g., for the gaussian tree model) may be a probabilistic output (e.g., indicating a probability or likelihood that a bot was used). The outputs of the bot detection models 640 may be combined in a weighted manner and used to determine whether a bot was used by the player account. In this example, it may be determined that a bot was detected 650.

In response to detecting the bot 650, enforcement parameters 660 may be generated. In this example, the enforcement parameters may correspond to not allowing the player account to access the trade market and also to slow down search functions for the player account. In this way, the advantages gained by the player account using a bot can be negated through the enforcement action that penalizes them for bot use, which aids in rebalancing the game experience for players who do not engage in cheating through bot use. The enforcement parameters 660 may be sent by the bot detection system 140 to the online gaming system 110 to cause the enforcement actions to be enforced by the online gaming system 110.

The bot detection system 140 may further generate documentation 670 related to finding an incidence of cheating associated with the player account. The documentation 670 may include a variety of information, such as an identifier of the cheating player 102 (e.g., player account identifier, real world player name, real world player email address, etc.), a timestamp when the player's bot detection was identified, API data 602 or portions thereof of the player 102, API metadata 620 or portions thereof of the player 102, bot detection model outcomes, bot detection 650, enforcement parameters 660 associated with the player account, and/or other notes associated with the player account. The documentation 158 may be used, in some cases, to memorialize why a particular player account is impaired with enforcement actions. In some other cases, the documentation 158 may be used to support any enforcement actions that are challenged by the corresponding player 102.

Figure 7:
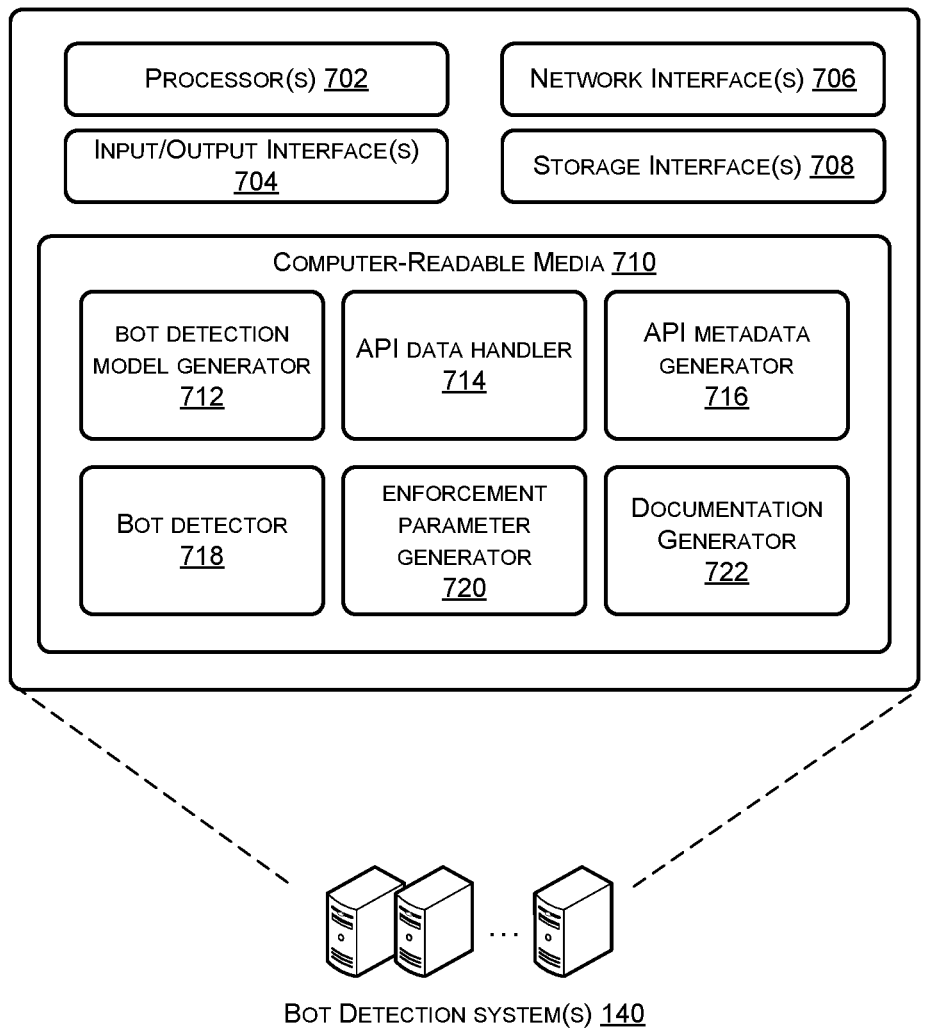
FIG. 7 illustrates a block diagram of example bot detection system(s) that may perform bot detection of online games hosted within online gaming system(s), in accordance with example embodiments of the disclosure.

FIG. 7 illustrates a block diagram of example bot detection system(s) 140 that may bot detection for online games, in accordance with example embodiments of the disclosure. The bot detection system(s) 140 may include one or more processor(s) 700, one or more input/output (I/O) interface(s) 702, one or more communication interface(s) 704, one or more storage interface(s) 706, and computer-readable media 710.

In some implementations, the processors(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the bot detection system(s) 140 to detect interaction with a user and/or other system(s), such as one or more game system(s) 110. The I/O interface(s) 702 may include a combination of hardware, software, and/or firmware and may include software drivers for enabling the operation of any variety of I/O device(s) integrated on the bot detection system(s) 140 or with which the bot detection system(s) 140 interacts, such as displays, microphones, speakers, cameras, switches, and any other variety of sensors, or the like.

The network interface(s) 704 may enable the bot detection system(s) 140 to communicate via the one or more network(s). The communications interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the bot detection system(s) 140 to transition between various standards. The network interface(s) 704 may further enable the bot detection system(s) 140 to communicate over circuit-switch domains and/or packet-switch domains.

The storage interface(s) 706 may enable the processor(s) 700 to interface and exchange data with the computer-readable medium 710, as well as any storage device(s) external to the bot detection system(s) 140, such as the API log datastore 142.

The computer-readable media 710 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 710 may be implemented as computer-readable storage media (CRSM), which may be any available physical media accessible by the processor(s) 700 to execute instructions stored on the memory 710. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information and which can be accessed by the processor(s) 700. The computer-readable media 710 may have an operating system (OS) and/or a variety of suitable applications stored thereon. The OS, when executed by the processor(s) 700 may enable management of hardware and/or software resources of the bot detection system(s) 140.

Several functional blocks having instruction, data stores, and so forth may be stored within the computer-readable media 710 and configured to execute on the processor(s) 700. The computer readable media 710 may have stored thereon a bot detection model generator 712, an API data handler 714, an API metadata generator 716, bot detector 718, an enforcement parameter generator 720, and a document generator 722. It will be appreciated that each of the functional blocks 712, 714, 716, 718, 720, 722, may have instructions stored thereon that when executed by the processor(s) 700 may enable various functions pertaining to the operations of the bot detection system(s) 140.

The instructions stored in the bot detection model generator 712, when executed by the processor(s) 700, may configure the bot detection system(s) 140 to train one or more bot detection models 152. These bot detection models may be of any suitable type, such as a decision tree model, a gaussian tree model, a Bernoulli model, a random forest model, linear regression models, neural network models, Bayesian network models, any variety of heuristics (e.g., genetic algorithms, swarm algorithms, etc.), combinations thereof, or the like. The bot detection system(s) 140 may receive training data and use the training data to generate the bot detection models 152.

The instructions stored in the API data handler 714, when executed by the processor(s) 700, may configure the bot detection system(s) 140 to receive and handle API data 130. The bot detection system 140 may store some of the API data 130 in a database, such as the API log datastore 142 for use later, such as to generate API metadata 150.

The instructions stored in the API metadata generator 716, when executed by the processor(s) 700, may configure the bot detection system(s) 140 to use the API data 130, as received from the online gaming system 110 and/or the API log datastore 142 to generate API metadata 150, as disclosed herein. API metadata generation may entail determining the number of API calls may by a player account to one or more APIs 120 over various periods of time.

The instructions stored in the bot detector 718, when executed by the processor(s) 700, may configure the bot detection system(s) 140 to apply the API metadata 150 to the one or more bot detection models 152 to make a determination of whether the corresponding player account has engaged in cheating by using a bot during online game play.

The instructions stored in the enforcement parameter generator 720, when executed by the processor(s) 700, may configure the bot detection system(s) 140 to determine one or more enforcement parameters related to enforcement action to take against player accounts using bots. These enforcement parameters may be sent to the online gaming system 110 for implementation.

The instructions stored in the document generator 722, when executed by the processor(s) 700, may configure the bot detection system(s) 140 to generate cheating documentation 158. The cheating documentation 158 may include any variety of evidence used to make an assessment that a player account has engaged in cheating by using a bot.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A bot detection system, comprising:
   one or more processors; and
   one or more computer-readable media storing computer-executable instructions that, when executed by the one or more processors, cause the one or more processors to:
   receive application programming interface (API) data associated with a player account;
   determine, based at least in part on the API data, API metadata associated with the player account;
   determine, based at least in part on the API metadata and one or more bot detection models, that the player account is using a bot during online game play, the one or more bot detection models comprising at least one machine learning model; and
   cause, based at least in part on determining that the player account is using the bot during online game play, an enforcement action for the player account.

2. The bot detection system of claim 1, wherein the computer-executable instructions further cause the one or more processors to:
   generate a document indicating that the enforcement action has been applied to the player account, the document including at least one of: (i) a timestamp of when it was determined that the player account was using the bot during game play; (ii) at least a portion of the API data; (iii) at least a portion of the API metadata; (iv) one or more identifiers of the player account; or (v) an output from the one or more bot detection models.

3. The bot detection system of claim 1, wherein to determine that the player account is using the bot during the online game play, the computer-executable instructions further cause the one or more processors to:
   apply the API metadata to the one or more bot detection models to determine one or more outputs of the one or more bot detection models; and
   combine the one or more outputs of the one or more bot detection models to determine that the player account is using the bot during the online game play.

4. The bot detection system of claim 1, wherein to cause the enforcement action for the player account, the computer-executable instructions further cause the one or more processors to:
   determine the enforcement action to apply to the player account;
   determine an enforcement parameter corresponding to the enforcement action to apply to the player account; and send, to an online gaming system, the enforcement parameter.

5. The bot detection system of claim 1, wherein to determine API metadata associated with the player account, the computer-executable instructions further cause the one or more processors to:
   determine, based at least in part on the API data, a total number of API calls made to a first API over a time period on behalf of the player account.

6. The bot detection system of claim 5, the computer-executable instructions further cause the one or more processors to:
   determine, based at least in part on the API data, a number of API calls made to the first API on behalf of the player account for individual ones of segments of the time period; and
   determine a standard deviation of the number of API calls for the individual ones of the segments of the time period.

7. The bot detection system of claim 5, wherein the computer-executable instructions further cause the one or more processors to:
   determine, based at least in part on the API data, a total number of API calls made to a second API over the time period on behalf of the player account.

8. The bot detection system of claim 1, wherein the computer-executable instructions further cause the one or more processors to:
   receive second API data associated with a second player account;
   determine, based at least in part on the second API data, second API metadata associated with the second player account;
   determine, based at least in part on the second API metadata and the one or more bot detection models, that the second player account is not using any bot during online game play; and
   allow, based at least in part on determining that the second player account is not using any bot during online game play, the second player to continue online game play.

9. A bot detection method, comprising:
   receiving, from an online gaming system, application programming interface (API) data associated with a player account;
   determining, based at least in part on the API data, API metadata associated with the player account;
   determining, based at least in part on the API metadata and one or more bot detection models, that the player account is using a bot during online game play;
   determining, based at least in part on determining that the player account is using the bot during online game play, an enforcement action for the player account; and
   sending, to the online gaming system, an enforcement parameter corresponding to the enforcement action to cause the enforcement action to be implemented for the player account.

10. The bot detection method of claim 9, wherein determining API metadata associated with the player account further comprises:
    determining, based at least in part on the API data, a total number of API calls to at least one API during at least one time period.

11. The bot detection method of claim 9, further comprising:
    receiving training data including one or more training data sets and one or more outcome data sets; and
    training, based at least in part on the training data, the one or more bot detection models.

12. The bot detection method of claim 9, wherein the enforcement action comprises slowing down online game play by the player account.

13. The bot detection method of claim 9, further comprising:
    receiving, from the online gaming system, second API data associated with a second player account;
    determining, based at least in part on the second API data, second API metadata associated with the second player account;
    determining, based at least in part on the second API metadata and the one or more bot detection models, that the second player account is not using any bot during online game play; and
    allow, based at least in part on determining that the second player account is not using any bot during online game play, the second player to continue online game play.

14. The bot detection method of claim 9, wherein determining that the player account is using the bot during online game play further comprises combining outputs of the bot detection models according to weights associated with individual ones of the bot detection models.

15. A system, comprising:
    one or more processors; and
    one or more computer-readable media storing computer-executable instructions that, when executed by the one or more processors, cause the one or more processors to:
    receive training data including one or more training data sets and one or more outcome data sets associated with bot usage during online game play;
    train, based at least in part on the training data, one or more bot detection models;
    determine application programming interface (API) metadata associated with a player account;
    determine, based at least in part on the API metadata and the one or more bot detection models, that the player account is using a bot during online game play; and
    cause, based at least in part on determining that the player account is using the bot during online game play, an enforcement action for the player account.

16. The system of claim 15, wherein the computer-executable instructions further cause the one or more processors to receive API data associated with the player account, wherein the API metadata is based at least in part on the API data associated with the player account.

17. The system of claim 15, wherein the computer-executable instructions further cause the one or more processors to generate a document indicating that the enforcement action has been applied to the player account.

18. The system of claim 15, wherein to cause the enforcement action for the player account, the computer-executable instructions further cause the one or more processors to:
    determine the enforcement action to apply to the player account;
    determine an enforcement parameter corresponding to the enforcement action to apply to the player account; and
    send, to an online gaming system, the enforcement parameter.

19. The system of claim 15, wherein the computer-executable instructions cause the one or more processors to determine training API metadata based at least in part on the training data, wherein the bot detection models are based at least in part on the training API metadata.

20. The system of claim 15, wherein the computer-executable instructions cause the one or more processors to determine, based at least in part on API data, a number of API calls made to a first API on behalf of the player account during a time period.

* * * * *